Sept. 27, 1955  F. E. VAN DUSEN  2,719,058
SILO UNLOADER
Filed June 14, 1951  7 Sheets-Sheet 1

INVENTOR.
FREDERICK E. VAN DUSEN
BY Paul, Paul & Moore
ATTORNEYS

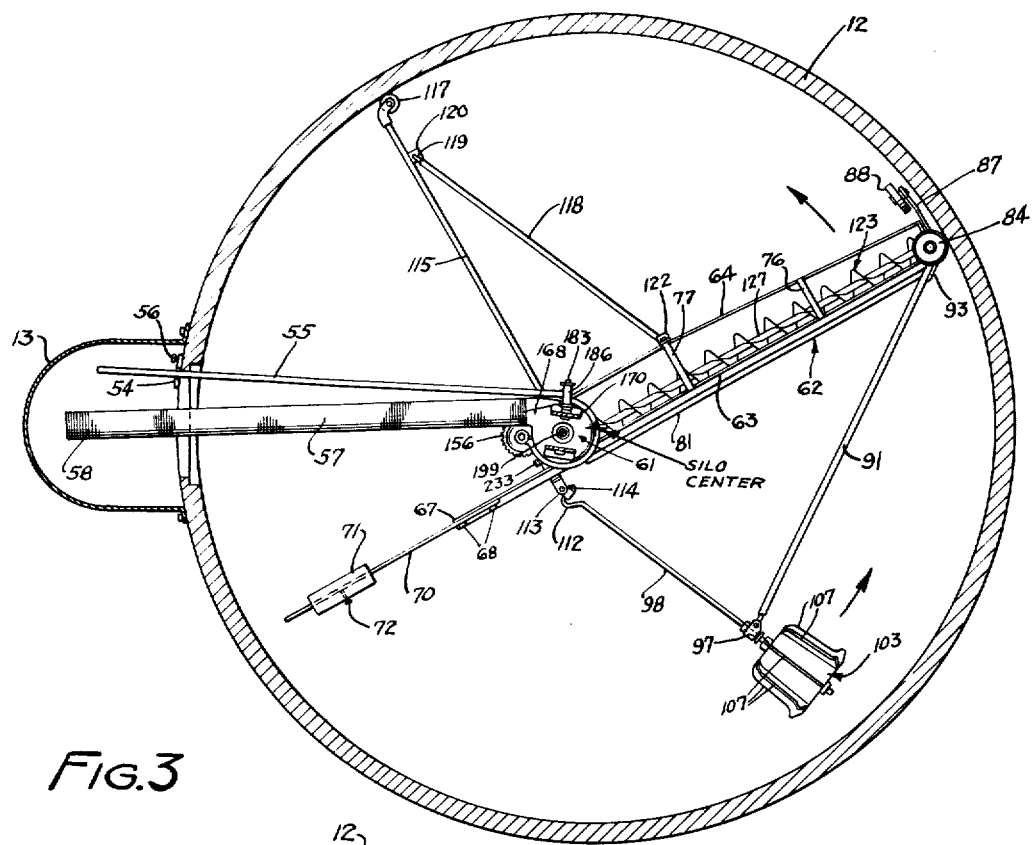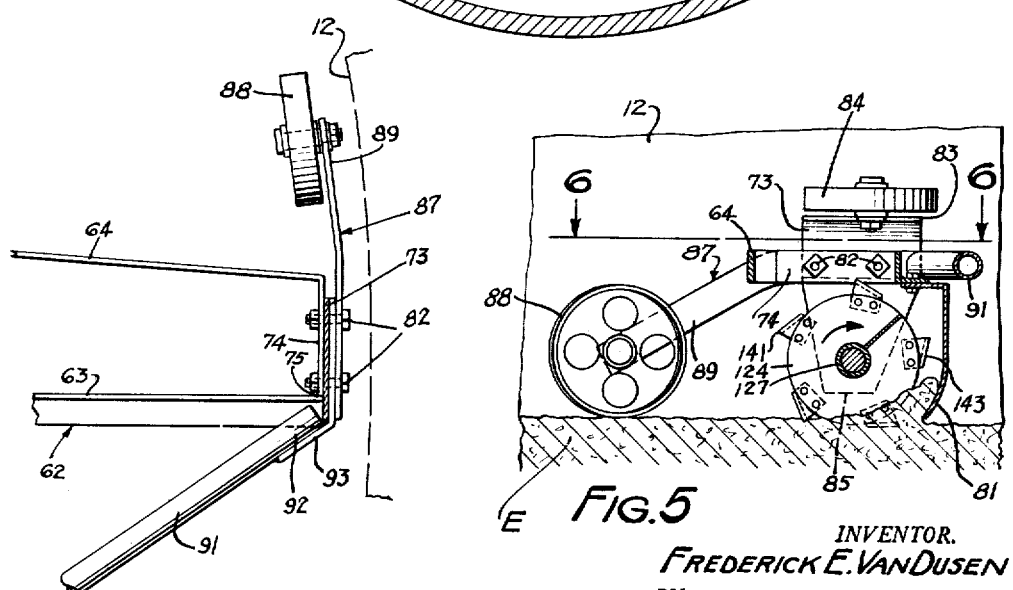

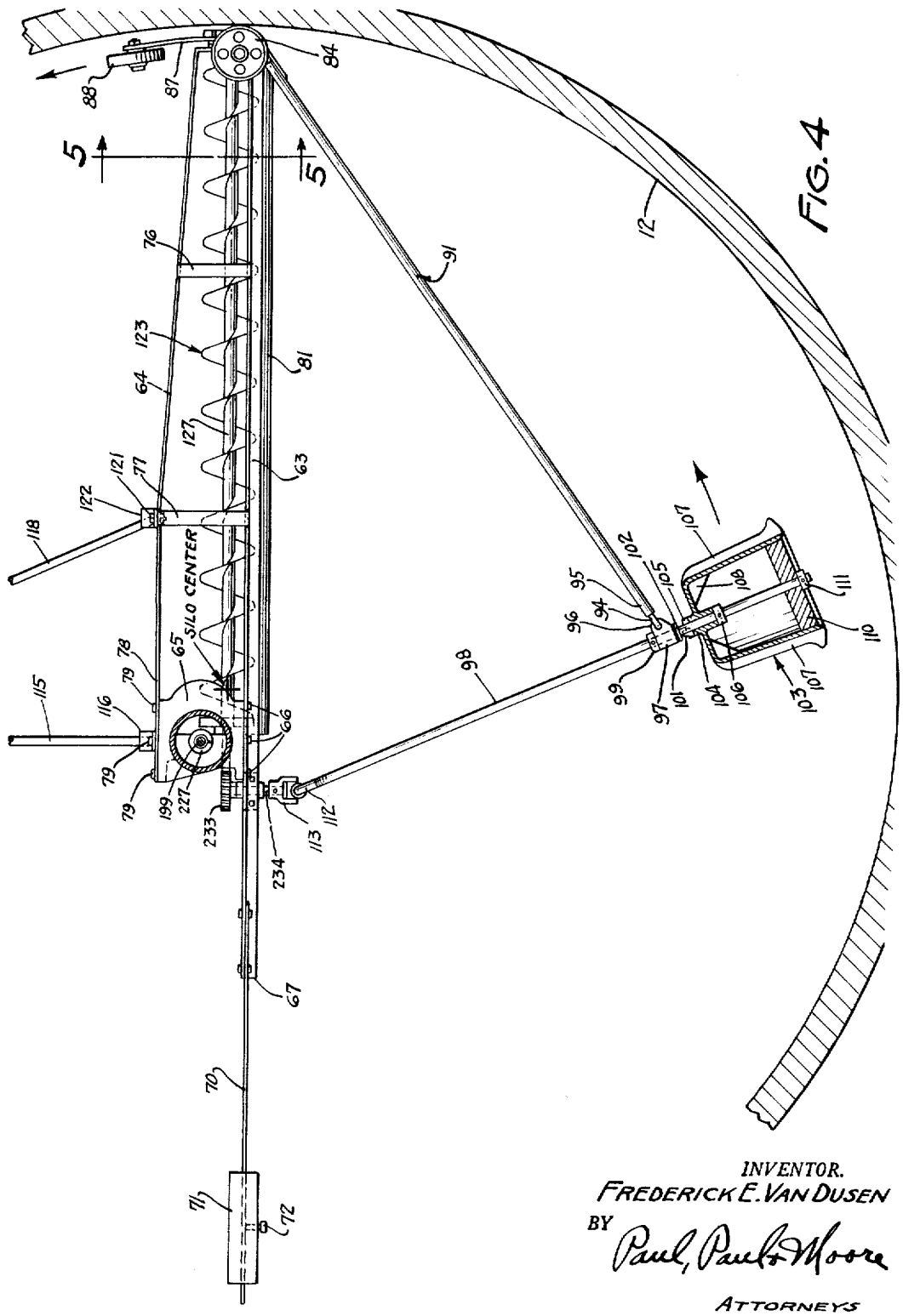

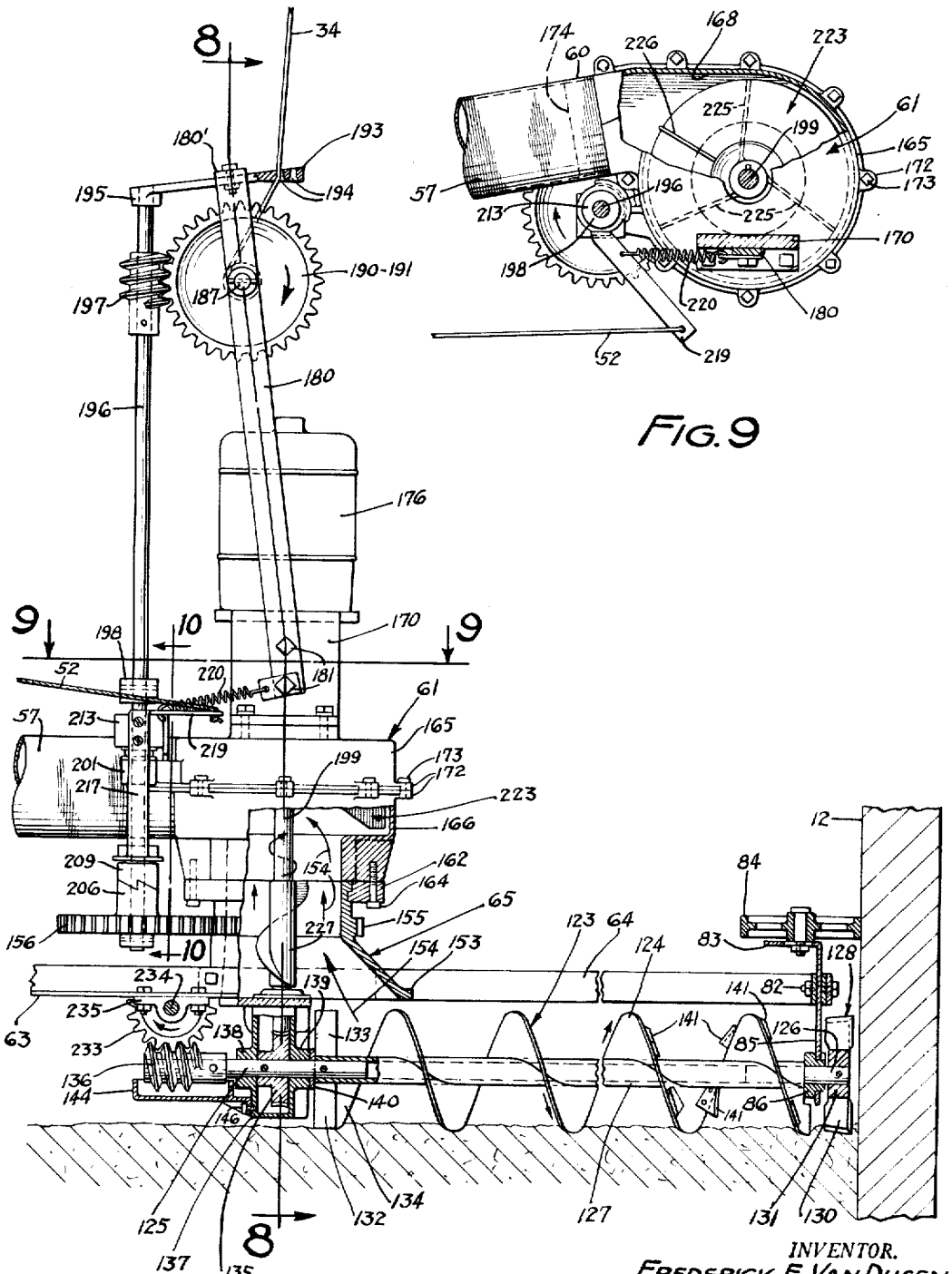

INVENTOR.
FREDERICK E. VANDUSEN
BY Paul, Paul & Moore
ATTORNEYS

INVENTOR.
FREDERICK E. VAN DUSEN
BY Paul, Paul & Moore
ATTORNEYS

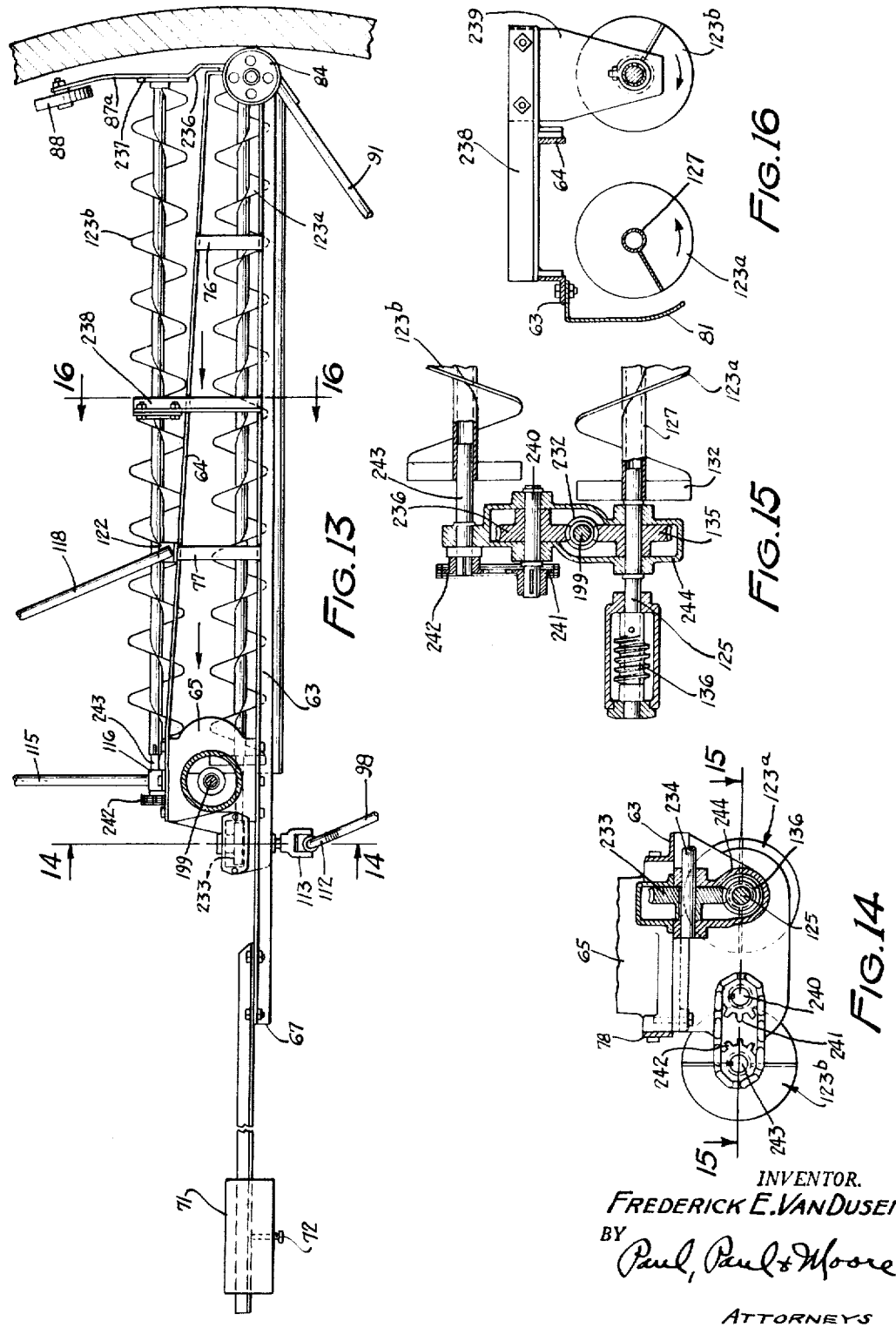

United States Patent Office

2,719,058
Patented Sept. 27, 1955

2,719,058
SILO UNLOADER

Frederick E. Van Dusen, Wayzata, Minn., assignor to Van Dale Farm Machines, Inc., Wayzata, Minn., a corporation of Minnesota Application June 14, 1951, Serial No. 231,562

33 Claims. (Cl. 302—56)

This invention relates to new and useful improvements in silo unloaders. More particularly the invention relates to new and useful improvements in silo unloaders which are designed for automatically following the level of the ensilage as it descends in the silo for the efficient unloading thereof.

Silos in the usual form comprise a right circular cylindrical wall which is provided with a peaked or hemispherical dome roof and a closed bottom. Into this shell the ensilage, formed of chopped green fodder is tightly packed. The silo is ordinarily provided with a plurality of lateral outlets or doorways extending vertically up one side of the silo and a chute positioned externally thereto. In removing the ensilage from the silo for stock feeding purposes, it is the usual practice to climb up to the ensilage level and manually shovel the ensilage into the chute. The plurality of apertures are normally closed by a plurality of doors or panels which are removed one by one from the top down as the surface level of the ensilage is reduced, so that the operator will have a convenient aperture through which to remove the ensilage.

Various automatic unloaders have been proposed for removing the ensilage from the silo, but these unloaders are in the main unsatisfactory since they have involved expensive and complicated machinery, special construction or require adaptation of a silo for the use, or are so constructed as frequently to become clogged and inoperative.

It is therefore an object of this invention to provide a silo unloader which is mechanical and automatic in operation for the unloading of ensilage from the surface thereof.

It is a further object of this invention to provide an automatic silo unloader so designed as to feed ensilage laterally through a silo wall and to follow down upon the surface of the ensilage in the silo as the ensilage is fed therefrom.

It is a further object of this invention to provide a silo unloader having means arranged to rotate on the upper surface of the ensilage, said unloader being adapted to follow the level of the ensilage as the level is reduced due to the unloading of the silo.

Another object of this invention is to provide a silo unloader which is of automatic operation and which is lowered in the silo to follow the ensilage as the quantity thereof decreases, and which is adapted to be supported by means disposed at the upper end of the silo.

It is another object of this invention to provide a silo unloader having rotary feed means adapted for travel on the surface of the ensilage, said rotary feed means having a length greater than the radius of said silo.

It is still another object of this invention to provide an automatic silo unloader designed to follow down upon the surface of the ensilage as the ensilage is unloaded wherein the unloader has operator-controlled means for de-clutching the feed means of the unloader in the event the unloader becomes overloaded.

It is a further object of this invention to provide a silo unloader adapted for following down upon the surface of the ensilage in a silo as the surface is reduced due to the unloading of the silo, wherein the device has a clearance lift means for elevating the unloader above the surface of the ensilage.

It is a further object of this invention to provide a silo unloader which is adapted to descend in the silo as the level of ensilage is reduced, said unloader having a flexible discharge means adapted to discharge ensilage laterally through openings in the wall of said silo.

Further objects of this invention reside in the construction of the feed auger, the drive means for imparting rotary motion to the silo unloader, the impeller and scroll ensilage removal means, in the means for maintaining the scroll in a stationary and non-rotatable position and in the provision of a silo unloader suspended from the axial center of the silo having a feed auger provided with a length substantially greater than the radius of the silo whereby complete removal of a surface of ensilage is provided, the unloader being oscillated orbitally about the silo center.

It is another and further object of this invention to provide a silo unloader which is capable of being operated by unskilled people; which is simple in construction and operation and able to unload a silo with a minimum of attention having a construction of maximum efficiency and ease of assembly.

Other and further objects of this invention are those inherent and apparent in the apparatus as described, pictured and claimed.

The invention will be described with reference to the drawings in which corresponding numerals refer to the same parts and in which:

Figure 3 is a top plan sectional view of a silo showing the silo unloader therein taken along the line and in the direction of arrows 3—3 of Figure 1;

Figure 4 is an enlarged fragmentary horizontal sectional view of a portion of the silo and unloader, taken along the line and in the direction of arrows 4—4 of Figure 1;

Figure 5 is a view taken along the lines 5—5 of Figure 4;

Figure 6 is a view taken along the lines 6—6 of Figure 5;

Figure 7 is an enlarged fragmentary elevational view partially in section and with certain parts removed of the driving apparatus of the unloader as shown in Figure 1;

Figure 9 is a view taken along the lines 9—9 of Figure 7;

Figure 13 is a top plan view partially in section showing a modified auger means of the instant invention;

Figure 14 is a view taken along the lines 14—14 of Figure 13;

Figure 15 is a view taken along the lines 15—15 of Figure 14; and

Figure 16 is a view taken along the lines 16—16 of Figure 13.

Figures 1, 2:
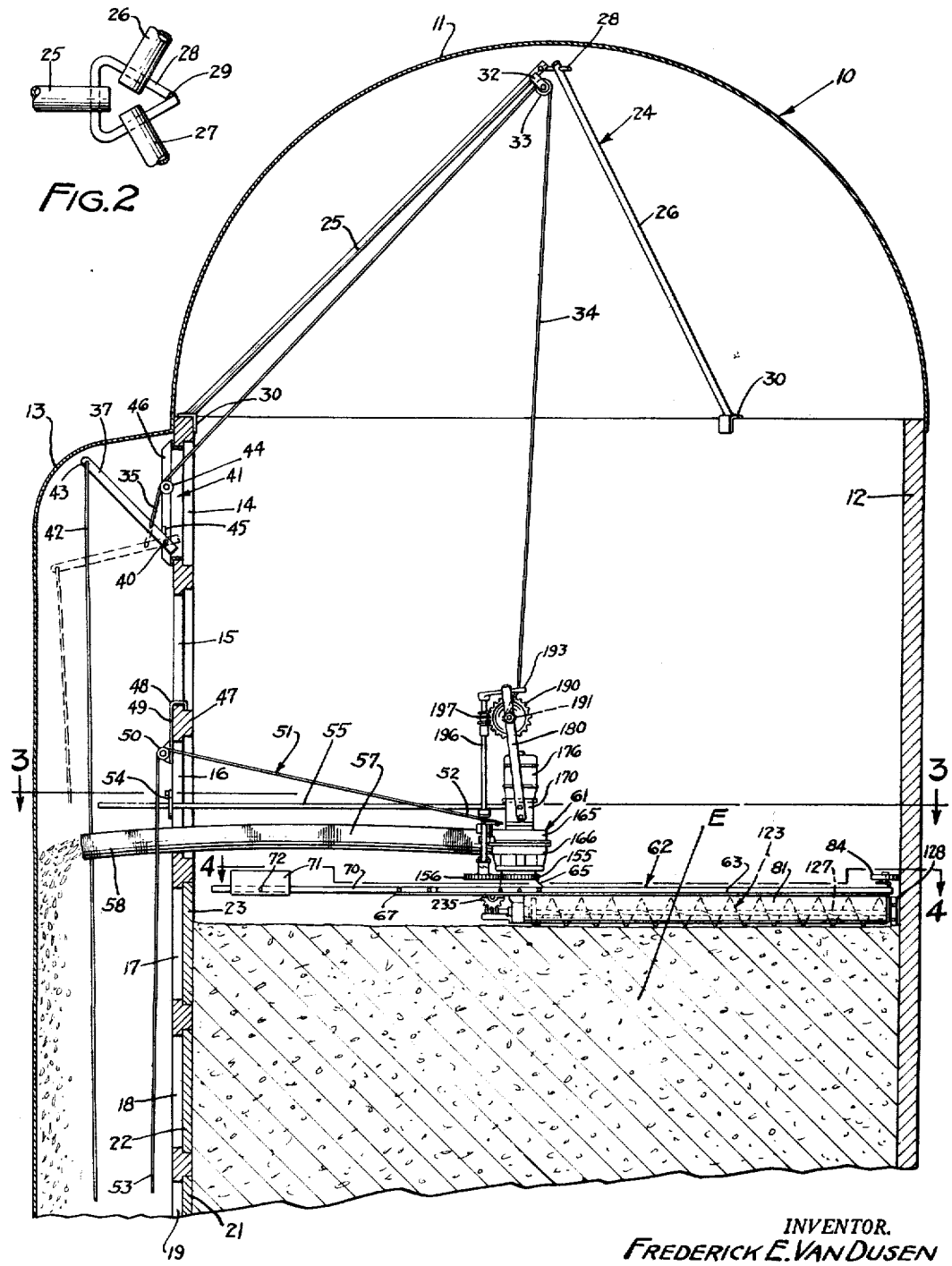
Figure 1 is a vertical sectional view of a conventional silo showing in elevation the silo unloader of the present invention in position therein.
Figure 2 is a top plan view, broken away, of the top of the unloader suspension tripod.

Referring now to the drawings, and particularly to Figure 1, there is shown a silo generally designated 10 composed of a hollow semi-spherical dome 11, having a vertical cylindrical wall 12 and an exterior chute 13. Dome 11 and chute 13 are seated and secured respectively to cylindrical wall 12 in any of the conventional well known manners which will not be described in greater detail inasmuch as they form no part of this invention, per se. Disposed in the wall 12 of the silo 10 underneath the cover of the exterior chute 13 is a plurality of vertically positioned apertures 14–19. The apertures 14–19 are provided with facings of any suitable sort which are adapted to receive and retain doors therein as is illustrated best with reference to Figure 1 wherein are shown doors 21, 22 and 23 for apertures 19, 18 and 17. Thus, as may be seen with reference to that figure, when the ensilage E is stored in the silo, the doors, which can be hinged or removable as at 21, are placed in their corresponding apertures, such as 19, and retained therein by any suitable means, the ensilage alone being packed sufficiently tightly to retain them in place.

Positioned beneath the dome 11 is a tripod 24 having legs 25, 26 and 27. Legs 25, 26 and 27 are joined together at the upper end thereof by a triangle 28 which is passed through apertures therein and welded or otherwise joined at 29. This may be seen best with reference to Figure 2. The legs 25–27 extend downwardly as may best be seen with reference to legs 25 and 26 in Figure 1 and are provided with a foot flange 30 which is positioned on the top edge of wall 12, as shown with reference to Figure 1. Thus, there is provided a triangular supporting device for suspending the silo unloader therefrom.

On the leg 25 of the tripod 24 which is for convenience positioned in line with the apertures 14–19 in the wall 12 of the silo 10 is a sheave block 32 having a sheave 33 journalled for rotation therein. A cable 34 has one end 35 attached to a clearance lift lever 37 and runs up over pulley 44 and thence over sheave 33 and then down to and around reel 191, as will be more fully explained hereinafter. End 35 is secured to lever 37 in any suitable manner usually by passage through an aperture therein and clamping thereto. Lever 37 is pivoted at 40 to a clearance lift bracket 41 as is shown best with reference to Figure 1. A control rope or cable 42 is attached to lever 37 at 43 and extends downwardly as shown in Figure 1. Sheave 44 is provided on bracket 41 over which cable 34 is passed. The clearance lift bracket, as is shown in Figure 1, is also provided with a stop 45 disposed slightly above pivot 40, against which lever 37 is adapted to abut. Thus, normally, the lever 37 assumes the full line position shown in Figure 1 as the silo unloader descends in the silo but may be moved to the position shown by the dotted lines of Figure 1 by downward pressure upon rope or cable 42. It may be noted that this provision of the clearance lift lever and stop causes the unloader to be always lifted a constant amount off the surface of the ensilage—an amount just sufficient to prevent "freezing down" if the unloader is allowed to stand without being used and an amount which is sufficient to lighten the initial load upon the unloader when it is initially started. The downward end of the rope or cable 42, not shown, is usually attached to an eye or other securing means, or may be left free if desired. The clearance lift bracket, as shown in Figure 1, thus comprises a pair of uprights 46, only one of which is shown, and sheave 44, stop 45 and pivot 40 extending therebetween. The ends of uprights 46 are attached to the frame 41 in any suitable manner. When rope 42 is pulled, this actuates lever 37 downward and hence pulls on cable 34, with the result that the entire silo-unloader mechanism can be raised a short distance. The purpose of this is so that the unloader may be positioned slightly off the surface of the ensilage to prevent "freezing down," particularly in cold weather, and to lighten the load upon the machine in starting.

Adapted for cooperation and positioning over the sill members between the apertures 14–19 and as shown particularly with reference to sill 47 is a U-bracket 48 having a depending extension 49 and a sheave 50 journalled for rotation thereon. Clutch operating cable 51 is passed thereover and extends downwardly, as shown in Figure 1, therefrom. End 52 is connected to the clutch mechanism for the operation of the same. The downwardly extending end 53 of clutch cable 51 may be left extending or may be wound and provided with a suitable weight not shown. The use of cable 51 will be subsequently described.

Any suitable type of hook or bracket 54 having an aperture therein for the insertion of torque arm 55 is provided for use in conjunction with the apertures of the silo. This bracket 54 may be of any type and may be stationary, in which case one bracket is needed for each of the apertures 14–19 or it may be removable, in which case only one bracket is needed. If removable, the bracket 48 can be suspended on any convenient support, for example the ladder rungs of the silo, if desired. Bracket 54 serves to maintain torque arm 55 in position for functioning as will be described in more detail hereinafter. If desired, the torque arm 55 may be mounted upon the device in such manner that the arm 55 will engage against the vertical wall of apertures 14–19, in which case the bracket member 54 may be dispensed with.

In the particular form of bracket 54 illustrated in the drawings, a hook which is adapted to be positioned over a bolt 56 is used as is shown best with reference to Figure 3. Thus, a plurality of bolts 56 is provided, one for each aperture 14–19, although only one bolt 56 is shown for aperture 16. However, it is to be understood that any suitable or desirable bracket or C-clamp or other device may be used for maintaining torque arm 55 in the position shown in Figures 1 and 3, it only being necessary that the torque arm 55 is positioned for horizontal reciprocation and vertical tilting movement with respect thereto as will be more fully understood hereinafter.

In general, the silo unloader mechanism can be considered as a mechanism suspended (or partially suspended) by the cable 34, which is played out automatically while the unloader is in operation, thus gradually lowering the unloader in response to the descending ensilage level. The unloader 61 has a radial gathering screw 62 which not only turns round and round radially, but also rotates as a screw so as to move the loosened ensilage toward the center of the silo where the ensilage is pulled up and then ejected by the blower fan. This radial gathering arm 61 is longer than the radius of the silo and is provided with a wheel 84 which rolls against the interior wall of the silo. Hence, the unloader is constantly pushed a little off center in a direction radially opposite to the gathering arm.

The body of the unloader is kept from turning by a torque arm 55. The blower, radial rotation of the gathering arm 62, screw rotation of the gathering arm and indeed the operation of the lowering winch 190—197 all are power driven.

Extending from the unloader 61 through any one of the apertures 14–19 as is shown with reference to aperture 16 in Figure 1 there is a flexible delivery spout 57 which has one end 58 extending into chute 13 and the other end 58 attached to scroll housing 61 whereby ensilage may be exhausted therefrom as is shown by the flow of ensilage emanating from end 58 with reference to Figure 1. The spout is flexible so as not to obstruct downward movement of the unloader.

The auger assembly or radial gathering arm, generally designated 62, comprises a frame having an angle member 63 and a strap member 64. Angle member 63 is joined to intake hub 65 by means of bolts 66 as may best be seen with reference to Figures 1, 4 and 8 and extends a short distance to the left thereof, as is shown best with reference to Figure 1 showing the angle member terminating at 67. Attached to end 67 by bolts 68, as may best be seen with reference to Figure 3 is an extending rod 70 upon which counterweight 71 having a set screw 72 is adapted to slide. Thus, the counterweight may be slid toward and away from the intake hub on rod 70 and will provide an adjustable counterweight or counterbalance for the auger assembly 62 as is well known. The other end of angle member 63 is welded or otherwise connected to end 74 of strap member 64 at 75, end 74 being bent at right angles to strap member 64. As may be seen best with reference to Figure 3 the member 64 takes the configuration shown therein and is additionally connected to angle member 63 by braces 76 and 77 which serve to connect members 63 and 64 at points approximately one-third of the way inward from each end. End 78 of member 64 is also connected to the intake hub 65 by bolts 79, as may thus be seen with reference to Figure 8. As is demonstrated particularly by Figure 8 the angle member 63 of the auger assembly 62 and the strap member 64 of the auger assembly 62 are connected respectively to opposite sides of intake hub 65.

Figure 8:
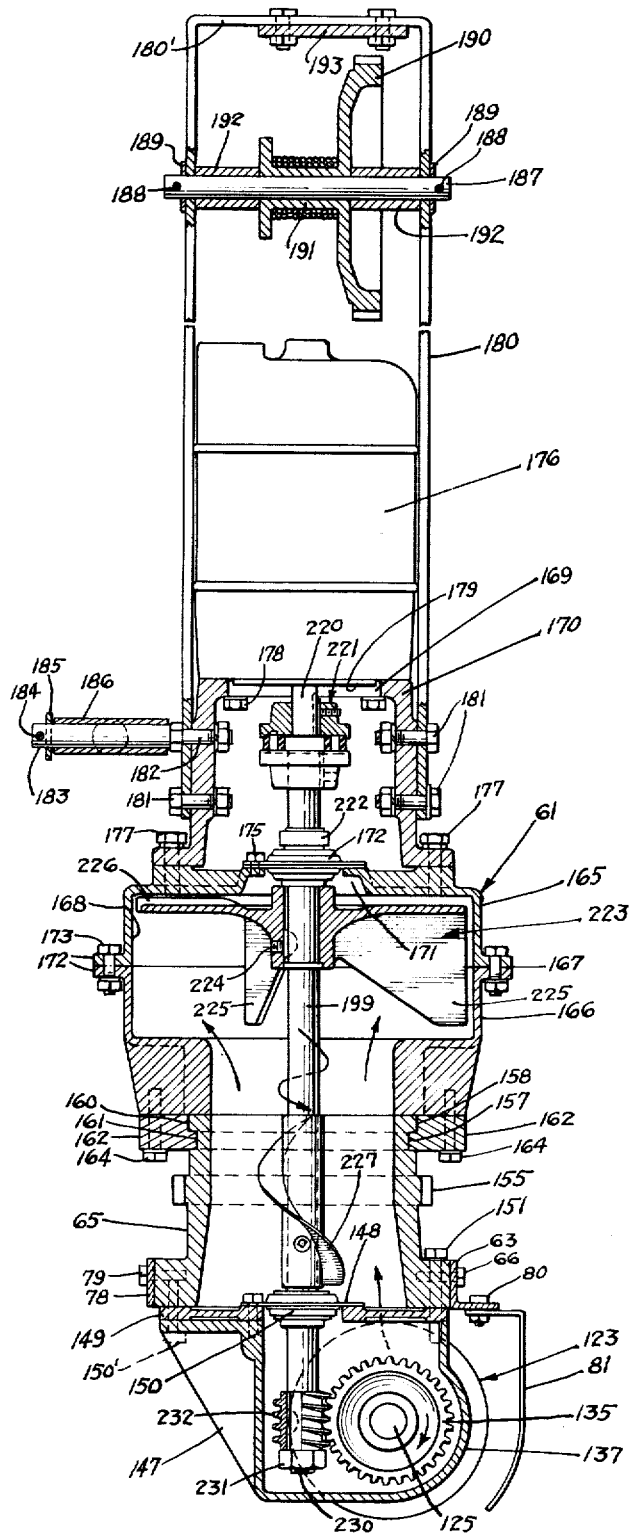
Figure 8 is a view taken along the lines 8—8 of Figure 7.

Connected to the horizontal flange of angle member 63 by bolts 80, only one of which is shown in Figure 8, is an auger shield 81 of the configuration shown in Figure 8 and which extends longitudinally along the entire length of the auger as may be seen with reference to Figure 1. Disposed on the outer or rightward end of the auger assembly with reference to Figures 1, 3, 4, 6 and 7, is an outer bearing support 73. This support is of the configuration best shown with reference to Figure 5 and is bolted to end 74 by means of bolts 82. It is provided with an inwardly extending horizontal flange 83. Flange 83 is apertured at the center thereof and guide wheel 84 is journalled on a vertical axis for rotation thereover. Wheel 84 is positioned so as to contact the wall 12 of the silo and to roll thereon and guide the auger assembly therearound, as is shown best with reference to Figure 3. At the same time the force of wheel 84 pushes the entire mechanism 61 a little off center, as shown in Figures 3 and 4. An aperture is provided in depending portion 85 of outer bearing support 73 in which is inserted a bearing block 86. This bearing block may be attached in any suitable manner. Also attached to end 74 by bolts 82 is an advance wheel support bracket 87. Bracket 87 has a downwardly and forwardly extending end 89 on which is journalled advance wheel 88 for rotation about the horizontal axis. Advance wheel 88, as is illustrated in Figure 5, is adapted for rolling upon the surface of the ensilage E of the silo and hence serves partially to support the auger assembly thereon and guide the same thereover as the assembly is rotated in the direction of the arrows shown in Figure 3.

A pusher brace 91 has a strap 93 welded or otherwise secured to end 92 and is maintained in position with reference to end 74 by bolts 82 passing through apertures therein as is shown best with reference to Figure 6. Thus, in Figure 6 there is shown end 74, outer bearing support 73 positioned adjacent thereto and strap 93 positioned between outer bearing support 73 and advance wheel bracket 87. Bracket 87, strap 93, support 73 and end of 64 are all apertured for the passage therethrough of bolts 82.

Tubular pusher brace 91 has a hook 94 welded or otherwise secured in end 95 thereof, as is shown best with reference to Figure 4. Hook 94 is of standard construction and is provided with an aperture at the terminating end, not shown, through which is adapted to be inserted a cotter key, also not shown. Hook 94 is passed through an aperture in protruding ear 96 of drive hub shaft bearing 97. Bearing 97 has a bearing surface not shown in which drive hub shaft 98 is journalled for rotation. A collar 99 is provided on drive hub shaft 98 which prevents any inward radial movement of bearing 97 thereon. Key 101 is welded into a slot or otherwise secured to drive hub shaft 98 and spaced apart from collar 99 as shown best with reference to Figure 4. Washer 102 is retained on the drive hub shaft 98 by the key 101 and thus collar 99 and washer 102 serve as limit surfaces for the inward and outward radial movement of bearing 97.

The drive hub 103 has a central boss 104 in which is provided a transverse key way 105 which is adapted for cooperation with key 101 whereby the hub will be keyed to the shaft, so that rotation of the shaft will rotate the drive hub. Boss 104 is maintained in position so that way 105 maintains cooperation with key 101 by the action of collar 106 which is in turn maintained in position on shaft 98 by means of a set screw. Drive hub 103 is of a configuration shown best with reference to Figure 4 and is provided with a plurality of extending ribs 107. The drive hub is usually cast of hollow construction and provided with the bell shaped ribs 107. If desired, inner strengthening webs 108 may be cast integrally with the drive hub. The plug weight 110 having a center aperture therein is forced into the end of the drive hub and hence frictionally maintained in position therein as is shown with reference to Figure 4. A collar 111 disposed on the outward end of shaft 98 serves to provide additional security for the plug 110. The weight 110 serves to cause an additional traction upon drive hub 103 and hence aids the ribs 107 in gripping the top surface of the ensilage E as the hub drives the apparatus in the direction shown by the arrow in Figure 4. Shaft 98, as may best be seen with reference to Figure 3, is provided with a hook 112 at the inner end thereof. Hook 112 is inserted through universal joint 113 and maintained thereon by the use of a cotter key and washer assembly 114 as is well known.

A guide rod 115 is provided having upon one end an angle flange 116 which is welded or otherwise secured thereto. Flange 116 is secured to intake hub 65 by the center one of the bolts 79 which also serves to secure strap 78 thereto as is best illustrated with reference to Figure 4. Disposed at the other end of guide rod 115 is a caster wheel 117. A brace 118 has one end provided with a hook 119 which is passed through an aperture in flange 120 which is attached to rod 115. The other end of rod 118 is provided with an angle flange 122 welded or otherwise secured thereto and which is in turn secured to strap 64 at its juncture with brace 77 by a bolt 121, as is shown best in Figure 4.

As may be seen best with reference to Figure 7, the auger generally designated 123 comprises an auger spiral 124 and a hollow shaft 127 having rods 125 and 126 welded or pinned to the interior thereof. Rod 126 is seated in bearing block 86 and at the exterior end thereof is provided with a wall cleaner 128 which is provided with a plurality of knives 130, in this particular instance being six in number, situated on wall cutter hub 131. Secured to the spiral 124 at the inner end thereof is a paddle comprised of two paddle arms 132 and 133. Arms 132 and 133 are rectangular and strap-like in nature, as may be seen with reference to Figure 7, and extend outwardly from shaft 127 in opposite directions, paddle 132 being secured to the terminal end 134 of spiral 124. The paddle wheel helps to toss into the blower 223 the ensilage that is gathered toward the center of the silo by the auger 123. Secured to auger shaft 125 by a pin or a set screw is auger drive gear 135. Also secured to rod 125 at the end thereof is a worm 136 pinned or keyed thereto. An auger drive gear housing 137 provides oppositely disposed bearing bosses 138 and 139 in which rod 125 is seated for rotation. A washer 140 is disposed between paddle arms 132 and 133 and boss 139, gear 135 is disposed within the interior of the housing 137, the interior edges of boss 138 and 139 limiting its axial movement, and worm 136, as mentioned previously, is disposed on end of shaft 125 and externally to the housing 137.

Turning now to Figure 5 it may be seen that the spiral auger 124 may be provided with a plurality of cutters 141 at the outer section thereof, if desired. This feature is optional and is best shown in Figure 5, wherein there are shown a plurality of cutters 141 riveted to the periphery of spiral 124, the cutters being provided with an edge 143 inclined outwardly with reference to the direction of rotation as shown by the arrow thereon. Cutters 141 help loosen frozen ensilage and grass ensilage. Underneath the worm 136 a drip pan 144 is provided to retain any grease from worm 136 and to prevent ensilage from becoming entangled therewith. Pan 144 is secured to housing 135 by bolts 146, as may best be seen with reference to Figure 7. Housing 137 has a stiffening web 147 at the back thereof and is of the configuration best shown in Figures 7 and 8. It is secured to intake hub 65 by means of bolts and a filler plate 149 is sandwiched between housing 137 and intake hub 65. Filler plate 149 is provided with a bearing 150 at the center thereof, bearing 150 being supported by plate 148 which is bolted to plate 149. Filler plate 149 is maintained in the sandwiched position between intake hub 65 and housing 137 by a plurality of bolts, some passing upward from housing 137 as bolt 150', as shown in Figure 8, and some passing downwardly from hub 65, as shown for bolt 151 in Figure 8. These bolts may be provided at any suitable place and in sufficient number to maintain housing 137, filler plate 149 and intake hub 65, readily in contact with one another, the surfaces of these elements being machined wherever they meet.

The intake hub 65, as may best be seen with reference to Figures 7 and 8, is roughly rectangular on the bottom exterior thereof and adapted for cooperation with housing 137. However, it may be noted particularly with reference to Figure 7, that housing 137 and filler plate 149 terminate closely adjacent the rightward side of the impeller shaft 199 and that housing 65 has a rightwardly extending lip 153 wherein the ensilage may be inducted as shown by the arrows 154. Hub 65 is provided with a machined gear track 155 on the exterior thereof at a point where the exterior contour of the housing changes from the roughly rectangular form to a cylindrical form. This gear is adapted for cooperation with spur gear 156 as will be more fully explained hereinafter. The circular exterior portion of hub 65 is machined at the top thereof to provide a recessed portion 157 and the cylindrical lip 158. Recess 157 and lip 158 are adapted for cooperation with the corresponding recess 160 and lip 161 which are provided on split collar 162. The respective lips and recesses of collar 162 and hub 65 are machined so as to provide a bearing assembly for the rotation of hub 65 in collar 162. The collar 162 is firmly secured to blower housing 61 by a plurality of bolts 164 secured around the periphery thereof.

Blower housing 61 comprises two sections, a top section 165 and a bottom section 166. The top and bottom sections 165 and 166 fit together along a median line 167 to provide a scroll 168. Below the scroll 168 the bottom section 166 takes a form roughly circular in nature and is adapted for cooperation with collar 162. Above the scroll 168, the top section 165 also takes a form roughly circular in nature and is adapted for cooperation with motor pedestal 170. The top section 165 has a central aperture 171 and a bearing 172 which is similar to bearing 150. The top and bottom sections 165 and 166 are provided with a plurality of ears 172 adapted for cooperation and through which bolts 173 are passed to maintain the two sections in juxtaposition to form the scroll cavity 168. Scroll 168 is provided with a circular mouth 174 upon which end 60 of delivery spout 57 is adapted to be resiliently seated. The exterior surface of this mouth 174 is therefore slightly tapered for this purpose. However, it is to be, of course, understood that a clamp means or other fastening means may be used for fastening end 60 to mounth 174. Aperture 171 of upper section 165 is closed by bearing 172 and secured thereto by means of bolts 175 attached around the peripheral surface thereof, as is shown best with reference to Figure 8.

The pedestal 170 upon which the motor 176 is mounted is securely attached to the top section 165 by bolts 177. The pedestal is U-shaped as is shown best with reference to Figure 8 and is provided with a central aperture 169 through which central shaft 152 is adapted to be passed. The diameter of the aperture 169 is considerably larger than the diameter of the shaft 152 and a plurality of bolts 178 is provided for securely seating protruding face 179 of motor 176 in concentric position therein. At the sides of pedestal 170 and disposed at a slightly leftwardly inclined angle thereto, as shown with reference to Figure 7, is attached hanger strap 180 by bolts 181 and 182. Bolt 182 is exactly the same as bolts 181 except that it is provided with an extended portion 183 having machined surface thereon. Portion 183 is apertured at 184 for the reception of a cotter key for the retaining of washer 185 and torque arm sleeve 186 thereon. The torque arm sleeve 186 is integrally connected with torque arm 55 at right angles thereto and forms the inward end thereof. Thus, the action of torque arm 55 is being restrained by hook 56 will prevent any rotation of the pedestal 170 and scroll 168, and consequently the blower housing 61. It may be noted that the torque arm sleeve 186 is adapted for substantial vertical pivotal movement about portion 183.

Figures 10, 11, 12:
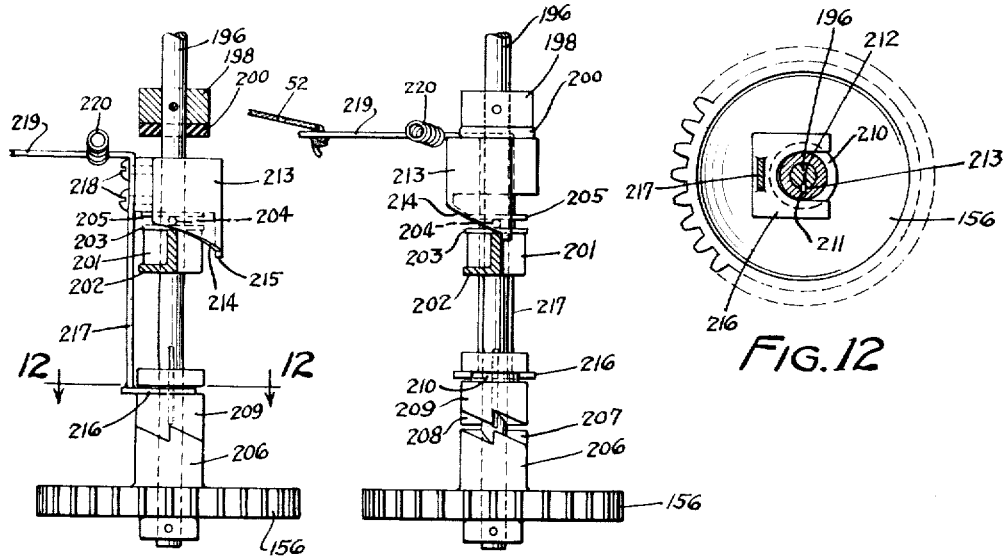
Figure 10 is a fragmentary elevation partially in section taken on the line 10—10 of Figure 7 of the clutch of the unloader showing the clutch in engaged position.
Figure 11 is a view similar to Figure 10 but showing the clutch in released or disengaged position.
Figure 12 is a view taken along the lines 12—12 of Figure 10.

Adjacent the closed portion 180' of the hanger strap 180 is provided a journal pin 187 which is retained in apertures therein by means of cotter keys 188 and washers 189. A drum and gear 190—191 is journalled for rotation on pin 187 and is maintained in position at the center thereof by spacer sleeves 192. The suspension cable 34 is wound around the drum section 191 as is shown best with reference to Figure 8. Positioned in abutment to the closed portion 180' of the hanger 180 and extending at right angles thereto is a cable guide member 193. Cable guide member 193 is secured to section 180' by bolts or other means. At the right end of this member 193 with reference to Figure 7 is provided a pair of apertures 194. The plurality of holes 194 allows for variation in the suspension of the device from the tripod support. The left end of cable guide member 193 with respect to Figure 7 terminates in a boss 195 having an aperture therein and providing a bearing surface for worm rod 196. Worm rod 196 has a worm 197 attached by set screw or otherwise attached to it and positioned for engagement by gear 190 whereby as worm 197 is rotated, gear 190 will likewise rotate in response thereto and uncoil the cable 194 from drum 191. As may be seen best with reference to Figures 10—11 rod 196 has spur gear 156 attached at the end thereto. Disposed upwardly a substantial distance from spur gear 156 is provided a thickened collar 198 secured to rod 196 by a set screw. Collar 198 is provided adjacent its bottom surface with reference to Figures 10—11 with a resilient washer 200. Affixedly secured to scroll 61 by an angle support 202 which is integral with section 165 is a clutch hub 201 which is apertured at the center thereof as may best be seen with reference to Figure 9 and thus maintains rod 196 in fixed lateral position while allowing rotation of the same. A washer 203 is positioned on top of hub 201. A pin 204, as may best be seen with reference to Figures 10—11, is passed entirely through the center of rod 196 and extends at both ends therefrom. A second washer 205 encircles shaft 196 but is positioned above pin 204. As may be seen with reference to Figures 10—11 the rod 196 with the attendant mechanical elements thereof is consequently supported by the engagement of pin 204 with the washer 203 of hub 201.

Spur gear 156 is provided with a sleeve portion 206 which terminates in a ratchet face 207. Ratchet face 207 is adapted for cooperation with the ratchet face 208 of clutch element 209. Clutch element 209 is provided with a circular depression 210 and a keyway 211. Rod 196 is also provided with a corresponding keyway 212 in which key 213 is inserted. Thus, while clutch element 209 is positioned on rod 196 for vertical movement, it is keyed thereto for rotation therewith.

A clutch cam 213 is provided having a downwardly inclined face 214 and a limit stop 215. Face 214 is adapted for riding movement on the upper edge of angle support 202 as may best be seen with reference to Figure 11 and is limited in its movement thereon by limit stop 215. A fork 216 is positioned in the circular depression 210 as is shown with reference to Figures 10–11. Fork 216 is disposed at right angles to depending support 217 and is integral therewith. Support 217 is in turn attached to cam 213 by screws 218, and is provided with a bent-over projection which forms a clutch arm 219 to which is attached end 52 of the clutch operating cable 51. A coil spring 220 has one end attached to the clutch arm 219 and the other end attached to a suitable projection on the scroll 61 for maintaining the clutch arm 219 in the position shown in Figures 1, 7 and 10.

Central impeller shaft 199 is secured to the motor drive shaft 220 for rotation therewith by a flexible coupling generally designated 221. A collar 222 adapted for cooperation with bearing 172 aids in maintaining the impeller shaft 199 in vertical position. Disposed for rotation within the scroll 61 is a fan 223. Fan 223 is provided with a key and set screw 224 for firmly attaching it to impeller shaft 199. The fan 223 has a disc top and is provided with three vertical blades 225 which are of the configuration shown best in Figure 8. Placed on top of the disc top and formed integrally therewith is one scraper fin 226. It may be noted with reference to Figure 9 that the three blades 225 are disposed somewhat tangentially to the impeller shaft.

The bottom end of shaft 199 with reference to Figure 8 terminates in a threaded portion 230 upon which is secured a nut 231. Directly above nut 231 and abutting the same is a worm 232 which cooperates with auger drive gear 135 for driving the same. The worm is keyed to the shaft 199 and is assisted in being maintained in position by nut 231.

Figure 12A:
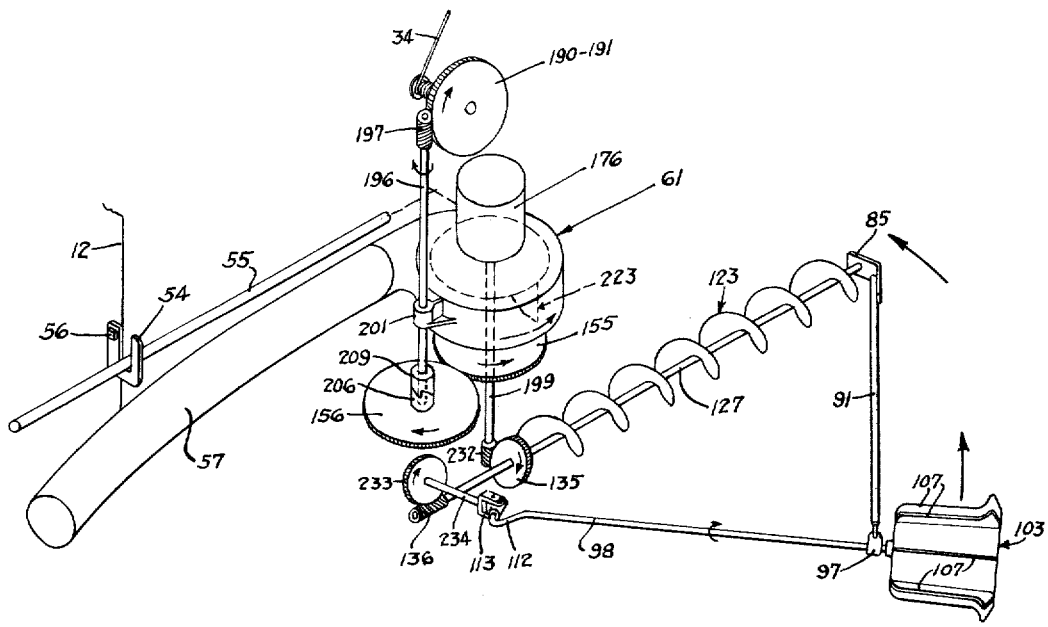
Figure 12a is an isometric diagrammatic view of the unloader of the instant invention.

With reference particularly to Figures 4 and 7 and 12a, it may be seen that as the impeller shaft 199 is driven by the motor 176, the worm 232 serves to drive auger drive gear 135 which in turn drives worm 136. Worm 136 drives gear 233 which is affixed to hub drive shaft 234 which is in turn affixed to universal 113 whereby rotation of gear 233 will cause the rotation of the drive hub 103. Shaft 234 is supported in a pillow block 235 which is bolted to the underside of angle member 63, as may be seen best with reference to Figure 7. Impeller 227 is mounted on central shaft 199 and the spiral vane thereof carries ensilage upwardly, as shown by the arrows in Figure 8.

Referring now particularly to Figures 13–16, there is shown a modification of this invention in which two feed augers are provided for rotation in a direction opposite to one another so as to feed in ensilage in an inward direction therebetween. Thus, with reference to Figure 13, it may be seen there is provided feed augers 123a and 123b. Feed auger 123a is constructed exactly the same as auger 123 and feed auger 123b is constructed similarly thereto except that the spiral runs in the reverse direction as may be seen with reference to Figure 13. Thus, when auger 123b rotates in the direction of the arrow in Figure 16 and when auger 123a rotates in the direction of the arrow shown in Figure 16 ensilage will be fed from the right to the left in Figure 13 therebetween. In this modified form, the advance wheel support bracket is designated 87a and is similar to advance wheel support bracket 87 except that it is elongated and provided with an inward bend 236 so as to provide a support for bearing block 237. A supporting angle 238 is welded to angle member 63 and strap member 64 and projects over strap member 64 as may be seen with reference to Figure 16. As is seen with reference to Figure 16, there is secured to angle member 238 an auxiliary bearing block 239 which serves to support auger 123b at approximately the center thereof. Also, in this modified form, as may be seen with reference to Figure 13, it is necessary to weld or otherwise secure the rod 118 in a position on strap member 64 slightly higher than that shown in Figure 3 so that clearance is obtained for the rotation of auger 123b. It may be seen with reference to Figures 14 and 15 that the impeller housing in modified form has been enlarged so as to provide a housing which covers not only the gear 135 for auger 123 (in the modified form of auger 123a) but so as to enclose gear 236 which is oppositely disposed to gear 135 and operated by worm 232. Gear 236 is fixedly attached to shaft 240 as is sprocket 241 which is keyed thereto. The similar sprocket 242 is attached to the end of shaft 243 of auger 123b as seen in Figure 15. In this modified form, the pillow block 235 is shown encompassed in a housing.

In the operation of the modified form shown in Figures 13–16, the augers rotate toward one another as shown by the arrows in Figure 16 and gather the ensilage to force it from a direction to right or left, as is shown in Figure 13, and thence into the intake in a manner similar to that to be described for the operation of the form shown in Figures 1–12a.

Referring now particularly to Figures 1–12a, it may readily be seen that the apparatus of the instant invention may be placed in a conventional silo without substantial modification thereof. The tripod 24 is positioned on the top periphery of the silo wall as may be seen with reference to Figure 1. The silo is filled with ensilage E to a point corresponding to the top edge of the wall 12. However, as the ensilage remains in the silo, it will settle to a point substantially below the first window 14. If the ensilage does not so settle, it must be removed by hand shoveling until it has reached such a level. The door for window 14 is then removed and the clearance support bracket 41 positioned therein as shown in Figure 1, the delivery tube 57 in the initial stages of the unloading also being positioned through window 14 as is the bracket 48. As the silo unloader operates to remove the ensilage from the silo, the delivery tube is subsequently positioned in windows 15–19, etc. It may be noted that the delivery tube is flexible and the silo unloader may be operated for a depth equal approximately to two window lengths before it is necessary to stop the movement of the silo unloader and re-position the delivery tube at a lower level. As the unloader is moving downward in the silo and unloading the ensilage therefrom, if the auger mechanism should become overloaded, the operator will disengage the clutch by pulling on the suspending clutch weight which will move the clutch arm 219 from the position shown in Figure 10 to the position shown in Figure 11, whereupon the ratchet face 208 will be disconnected from ratchet face 206 and the rod 196 will no longer be rotated to unwind the cable from drum 190. After the clutch has been operated to the disengaged position shown in Figure 11, the feed auger 123 is allowed to run in this position until the auger has cleared itself or "caught up," whereupon the clutch may be allowed to resume the position shown in Figure 10.

It may be noted at this time that when the cam 213 assumes the position shown in Figure 11 the resilient washer 200 will be squeezed between the top surface thereof and collar 198 and thus will serve to effectively prevent the rotation of worm 197 and drum 190. The counterweight 72 is slid backward and forward on angle 70 to counterbalance the weight of the auger assembly 62. As may be seen best with reference to Figure 12a, the rotation of the drive shaft of the motor rotates the fan 223, and the worm gear 232. Rotation of the worm gear 232 causes the rotation of the auger 123, or, as in the case of the modified form shown in Figures 13–16, the rotation of augers 123a and 123b. Rotation of the auger 123 causes also the rotation of worm 136 which rotates worm gear 233 and through the universal coupling 113 the drive hub 103 in the direction shown by the arrow in Figure 4. As the auger 123 swings radially round and round it rotates portion 65 of the unloader and likewise rotates the gear part 155 thereon. Since gear 156 is journalled on frame of blower 61 (which is in turn held from turning), it follows that gear 156 will be rotated and this through shaft 196 and gears 197 and 190–191 operates the winch to lower the entire mechanism. Rotation of auger 123 therefore causes rotation of the housing gear 155 which in turn will cause rotation of the spur gear 156 in the direction indicated by the arrow thereon and the consequent rotation through the clutch of rod 196. Rotation of rod 196 carrying with it the rotation of the worm 197 will cause the consequent unwinding of drum 190, allowing cable 34 to unwind therefrom and thus allow gradual settling of the unloader down in the silo as the ensilage level drops.

The provision of the torque rod 55 which is maintained in fixed position with reference to rotation by bracket 54 will insure that blower housing 61 will not rotate as the intake hub 65 and the auger 123 is rotated around the silo. As the drive hub 103 rotates in the direction of the arrow shown on the shaft thereof, it will walk round and round in a direction counterclockwise with reference to Figures 4 and 12a. This will cause rotation of member 65 and gear 155 as just explained. Advance wheel 88 will roll on the surface of the ensilage as may be seen with reference to Figure 5 and wheel 84 will roll on the inner surface of the silo wall as shown in Figure 4. Caster 117 will also roll on the inner surface of the silo wall as may be seen with reference to Figure 3. As caster 117 and roller 84 engage the inner surface of the silo wall 12 and hub 103 causes the rotation of the auger and intake hub, the whole silo unloader will shift its axial position with reference to the silo center since it is positioned eccentrically with respect thereto, as may be seen with reference to Figure 3, wherein it may be noted that rod 115 and auger 123 are both of an extension that is greater than the radius dimension of the silo. Consequently, as the auger is rotated in the silo, the axial center of ensilage in the silo is always engaged by the auger spiral 123 and consequently no amount of undelivered silage will be left in the center thereof as the unloader operates. The teeth 143 on the outer section of the spiral serve to cup up any ensilage which may be frozen and to provide a start for the engagement of the auger 123 with the ensilage E. The wall cleaner 128 provided with blades 130 as may best be seen with reference to Figure 7 will serve to insure that no ledge of silage is retained in position next to the wall 12. The paddles 132–133 serve to give the ensilage added impetus as it is forced upward through intake hub 65 by the action of the auger 123 and of the impeller 227 and of the fan 223. The impeller 227 serves, in conjunction with the draft of air produced by the fan, to force the ensilage upward through the intake hub and outward through the delivery spout 57. The fan will suction air through the intake hub and the ensilage along with it as shown by the direction of the arrows in Figure 7. The provision of the single fin 226 on the top of the fan blade assembly 223 insures that any ensilage which should adhere between the top of the fan assembly and the scroll will be scraped therefrom and consequently discharge through the delivery tube.

As many apparently widely different embodiments of this invention may be made without departing from the spirit and scope thereof, it is to be understood that I do not limit myself to the specific embodiments disclosed herein.

What I claim is:

1. A silo unloader adapted to be positioned upon the surface of the ensilage in a silo for the unloading thereof comprising in combination a feed auger means, said feed auger means having an exterior end and an interior end and a spiral means journaled for rotation to feed ensilage from said exterior end towards said interior end, said feed auger means journaled for rotation about said interior end and in a horizontal plane on the surface of said ensilage, motor means for rotating the same, a drive hub means extending radially with respect to said interior end and having a rotating hub positioned upon the surface of said ensilage for rotating said feed auger means in said horizontal plane on the surface of said ensilage, motor means for rotating said spiral means for feeding said ensilage from said exterior end towards said interior end, motor means for rotating said drive hub, a delivery spout positioned to receive material fed from said auger and having an end positioned for discharging said material from said silo, said feed auger means having a length dimension greater than the radius of the silo in which it is to be used, a suspension cable positioned for supporting said silo unloader from a position adjacent the top of said silo, a drum operable in relation to the horizontal rotation of said auger means, said cable being wound around said drum and said drum operable as said auger means rotates to unwind said cable from said drum as said auger means rotates, fan means positioned between said interior end and said delivery spout for delivering the ensilage from said interior end of said feed auger means into said delivery spout, and an impeller means operable in conjunction with said fan means for aiding in the delivery of said ensilage from said interior end of said feed auger means and into said delivery spout, means for actuating said fan and impeller means and means designed to prevent rotation of said fan delivery spout as said auger is rotated in said horizontal plane about the surface of said ensilage.

2. The apparatus of claim 1 further characterized in that a rotary means for supporting said auger means on the surface of said ensilage is provided, a rotary means on said auger means is provided for travel upon the wall of said silo, and an advance guide means extending radially and at an angle in the same plane with respect to said interior end is provided for positioning said unloader for guiding said auger means for rotation in said silo.

3. The apparatus of claim 2 further characterized by a clutch means for disconnecting said drum for unwinding said cable in response to said rotation of said auger means, and means operable in response to an operator for lifting said unloader from the surface of the ensilage.

4. The apparatus of claim 2 further characterized in that said auger means comprises two rotary spirals situated for rotation in opposite directions to one another and for feeding ensilage therebetween.

5. A silo unloader comprising a frame, a motor-driven blower mounted on said frame, a power winch mounted on said frame having a cable wound thereon, said cable being adapted to be attached to a support for supporting the frame, said frame being thereby lowered when the winch is rotated to play out the cable, said blower having an outlet tube extending outwardly therefrom, a gathering arm rotatably mounted on said frame for radial swinging movement in a substantially horizontal plane, said arm having an auger journalled thereon and extending along the arm, a gear connection between the motor and the auger for rotating said auger, a second radial arm extending outwardly from said first radial arm and at an angle thereto, said radial arm being journalled for rotation, a drive wheel at the outer end of said arm, a pusher connection between said arm and said first radial arm so that when the drive wheel is rotated upon a supporting surface, the second radial arm is pushed arcuately so as to move the first radial arm arcuately about said frame, gear connection means between the auger shaft and said second radial arm for rotating the latter, a gear mounted for rotation with said first radial arm and gear drive means connecting said gear and said winch for rotating the winch as the first and second radial arms are moved arcuately thereby to lower the entire assembly.

6. A silo unloader comprising a frame having a motor-driven blower mounted thereon, a collar mounted for rotation upon a substantially upright axis on said frame, a first and second radial arm mounted on said collar, a spiral auger journalled on the first of said arms, said auger being downwardly exposed and gear connected to the motor so as to be driven thereby, said second radial arm being journalled for rotation and gear connected to the auger so as to be rotated thereby, a connection between the first and second radial arms so that as one moves the other will also be moved, a drive wheel mounted on the second rotatable radial arm for moving it arcuately thereby also to move the first radial arm arcuately, a gear on said collar rotated threewith, a winch on the frame having the supporting cable wound thereon, said cable being adapted to be attached to a support for suspending the unloader and power drive means connecting the gear on said collar and said winch for rotating the winch as said collar is rotated by said radial arms, and means for stabilizing the frame against rotation.

7. A silo unloader comprising in combination an intake means, means for delivering material thereto, journalled for rotation about said intake means, an impeller disposed within said intake means, a chute for delivering material from said intake means, a fan positioned adjacent said chute, a motor for operating said means for delivering material, said impeller and said fan, and a drive shaft attached to said motor and journalled for rotation about a vertical axis, and said drive shaft connected to said fan means and said impeller for the simultaneous operation thereof.

8. A silo unloader comprising in combination an intake means, means for delivering material thereto journalled for rotation about said intake means, an impeller disposed within said intake means, a chute for delivering material from said intake means, a fan positioned adjacent said chute, a motor for operating said means for delivering material, said impeller and said fan, and the drive shaft of said motor being journalled for rotation about a vertical axis, said impeller and said fan being attached to the drive shaft of said motor, a blower housing for said fan connecting said intake means and said chute, and means for rotating said means for delivering material relative to said blower housing attached to said shaft.

9. A silo unloader comprising in combination a motor, a blower housing, an intake housing, an exhaust chute, and means for delivering material to said intake housing, said motor being mounted on one side of said blower housing, said intake housing being mounted on the other side thereof, a central shaft rotated by said motor extending through said blower housing and said intake housing, a blower disposed in said blower housing and affixed to said shaft for rotation therewith, an impeller disposed in said intake housing and affixed to said shaft for rotation therewith, and means for rotating said means for delivering material to said intake housing with respect to said blower housing.

10. The apparatus of claim 9 further characterized in that said intake housing is journalled for rotation relative to said blower housing.

11. The apparatus of claim 9 further characterized in that said means for rotating said means for delivering material to said intake housing with respect to said blower housing comprises gear means affixed to said central shaft for rotation therewith.

12. In a silo unloader having a motor, a blower housing enclosing a blower journalled for rotation about a vertical axis, an intake housing enclosing a vertical impeller positioned therebeneath, means for receiving ensilage exhausted from said blower, and means for delivering ensilage to said intake housing, the improvement comprising a central shaft extending through said blower housing and said intake housing for rotating said blower and said impeller.

13. The apparatus of claim 12 further characterized by means affixed to said central shaft for rotating said means for delivering material about the axis of said blower housing.

14. The apparatus of claim 12 further characterized by means affixed to said central shaft for operating said means for delivering material for the delivery thereof and means responsive to the operation of said central shaft for rotating said means for delivering material relative to said blower housing.

15. A silo unloader comprising in combination a rotary feed means journalled for rotation about its interior end and adapted to feed ensilage toward the center of a silo and including a supporting frame, delivery means positioned adjacent the interior end of said feed means to receive material fed thereby and for discharging the same from the silo, and an advance guide wheel means secured to said supporting frame positioned ahead of said feed means and in the path of rotation thereof, and drive means positioned behind said feed means for the rotation thereof.

16. The apparatus of claim 15 further characterized by a wall engaging wheel means positioned on the exterior end of said feed means.

17. The apparatus of claim 15 further characterized in that said feed means has an extension greater than the radius of the silo in which it is to be used and wheel means positioned on the wall of the silo for guiding said feed means for rotation.

18. In combination, a radial gathering means for feeding ensilage toward the center of a silo, said gathering means journalled for rotation in a horizontal direction about its interior end, means for rotating said gathering means in said horizontal direction, means adapted to receive material gathered thereby and to discharge the same from the silo, and said means all being suspended from a tripod supporting means positioned adjacent the top of the silo and adjustably supported upon the vertical wall of the silo.

19. A silo unloader comprising in combination feed means adapted to be positioned on the surface of the ensilage for feeding material from the exterior end toward the interior end thereof to a delivery means, a delivery means positioned for cooperation with said feed means for feeding said ensilage from the silo, drive means positioned on the surface of the ensilage for rotating said feed means about said interior end, said means including a drive hub positioned rearwardly of said feed means and positioned so as to drive the extending end of said feed means into constant engagement with the silo wall.

20. The apparatus of claim 19 further characterized by a first wall engaging wheel adjacent said extending end of said feed means, and a second wall engaging wheel positioned ahead of said feed means.

21. The apparatus of claim 19 further characterized by a third wheel engaging the surface of the ensilage and positioned adjacent and ahead of said extending end of said feed means.

22. A silo unloader comprising in combination feed means having an exterior end and an interior end journalled for rotation in a horizontal direction about said interior end, means for rotating said feed means in said horizontal direction, a delivery means positioned to receive material fed by said feed means and for delivering the same from the silo, said entire mechanism being pendantly supported from a point substantially at the center of a silo by a flexible member, one end of said flexible member being secured adjacent said interior end whereby the extension of said flexible member will form an acute angle with reference to the vertical and said end of said flexible member secured to said interior end will be displaced in a direction with reference to the center of the silo opposite to the direction of extension of said feed means.

23. A silo unloader comprising in combination a rotary feed means journalled for rotation about its interior end and adapted to feed ensilage toward the center of a silo, delivery means positioned adjacent the interior end of said feed means to receive material fed thereby and for discharging the same from the silo, wheel means carried by said feed means for engaging the wall of the silo for positioning the exterior end with respect thereto, drive means for rotating said feed means about said interior end positioned behind said feed means with reference to the direction of rotation thereof and in the 90° quadrant behind said feed means, and advance guide wheel means positioned ahead of said feed means in the 90° quadrant in front thereof, said wheel means being journalled for rotation about a vertical axis and positioned to engage the wall of the silo.

24. The apparatus of claim 23 further characterized in that said drive means exerts force upon said feed means at an acute angle with reference thereto.

25. In a silo unloader having means for engaging the surface of the ensilage and for moving ensilage toward the center of the silo and relatively stationary means for receiving said ensilage and discharging the same from the silo, the improvement comprising torque arm means engaging the frame of said aperture in the silo and connected to said relatively stationary means for preventing the rotation thereof, and means provided whereby said torque arm means may reciprocate with reference to said silo wall for permitting orbital revolution of said stationary means about the center of the silo.

26. The apparatus of claim 25 further characterized in that said torque arm means comprises a rod pivotally connected about a horizontal axis to said relatively stationary means.

27. The apparatus of claim 25 further characterized in that said torque arm is slidably connected to the frame of said aperture, and extends therebeyond.

28. A silo unloader comprising in combination a gathering means for engaging the surface of ensilage in a silo for feeding ensilage toward the center thereof, said gathering means journalled for rotation in a horizontal direction about its interior end, means for rotating said gathering means in said horizontal direction, means adapted to receive material gathered thereby and to discharge the same from the silo, means urging the exterior end of said gathering means into engagement with the silo wall, a wall engaging wheel means positioned at said exterior end of said feed means, extending means joined at one end to said receiving means and having its other end in engagement with the silo wall for preventing rotation of said receiving means but permitting orbital revolution of the interior end of same around the center of the silo, said extending means pivoted to said receiving means about a horizontal axis at its interior end and having its exterior end rotatably fixed but axially slidable with reference to the silo wall to allow reciprocation thereof.

29. The apparatus of claim 28 further characterized by said gathering means engaging said ensilage throughout an extension greater than the radius of the silo in which it is to be used.

30. A silo unloader comprising in combination a gathering means for engaging the surface of ensilage in a silo for feeding ensilage toward the center thereof, said gathering means journalled for rotation in a horizontal direction about its interior end, means for rotating said gathering means in said horizontal direction, means adapted to receive material gathered thereby and to discharge the same from the silo, means urging the exterior end of said gathering means into engagement with the silo wall, a wall engaging wheel means positioned at said exterior end of said feed means, extending means joined at one end to said receiving means and having its other end in engagement with the silo wall for preventing rotation of said receiving means but permitting orbital revolution of the interior end of same around the center of the silo, said entire mechanism being pendantly supported from a point substantially at the center of the silo by a flexible elongated member, one end of said flexible member being secured adjacent said interior end of said gathering means whereby the extension of said flexible member will form an acute angle with reference to the vertical and said end of said flexible member secured to said interior end will be displaced in a direction with reference to the center of the silo opposite to the direction of extension of said gathering means.

31. A silo unloader comprising in combination a gathering means for engaging the surface of ensilage in a silo for feeding ensilage toward the center thereof, said gathering means journalled for rotation in a horizontal direction about its interior end, means for rotating said gathering means in said horizontal direction, means adapted to receive material gathered thereby and to discharge the same from the silo, said gathering means engaging said ensilage throughout an extension greater than the radius of the silo in which it is to be used, means urging the exterior end of said gathering means into engagement with the silo wall, a wall engaging wheel means positioned at said exterior end of said feed means, extending means joined at one end to said receiving means and having its other end in engagement with the silo wall for preventing rotation of said receiving means but permitting orbital revolution of the interior end of same around the center of the silo, said extending means pivoted to said receiving means about a horizontal axis at its interior end and having its exterior end rotatably fixed but axially slidable with reference to the silo wall to allow reciprocation thereof, said entire mechanism being pendantly secured from a point substantially at the center of the silo by a flexible elongated member, one end of said flexible member being secured adjacent said interior end of said gathering means whereby the extension of said flexible member will form an acute angle with reference to the vertical and said end of said flexible member secured to said interior end will be displaced in a direction with reference to the center of the silo opposite to the direction of extension of said gathering means.

32. A silo unloader comprising in combination a rotary feed means journalled for rotation about a vertical axis positioned at the interior end thereof, said feed means engaging the surface of ensilage in a silo, motor means for rotating said feed means, delivery means positioned to receive ensilage from said feed means and to discharge the same from the silo, means urging the exterior end of said rotary feed means into engagement with the silo wall, torque arm means engaging the wall of the silo for preventing the rotation of said delivery means but permitting orbital revolution of the delivery means around the center of the silo, said torque arm means being pivoted about a horizontal axis to said delivery means.

33. A silo unloader comprising a spiral flight gathering means positioned on the surface of the ensilage and resting thereon, said gathering means being journalled for rotation in a horizontal direction about its interior end, means for rotating said gathering means in said horizontal direction, means for rotating said spiral flight means for the feeding of material from the exterior end thereof, means adapted to receive material fed thereby and for discharging the same from the silo, an elongated flexible member pendantly supporting said unloader from adjacent said interior end of said gathering means, and said unloader being otherwise substantially unsupported whereby said unloader will be substantially supported by said elongated flexible member and the engagement of said spiral flight with said ensilage.

(References on following page)

References Cited in the file of this patent

UNITED STATES PATENTS

| | | |
|---|---|---|
| 1,225,802 | Greenawalt | May 15, 1917 |
| 1,275,558 | Holmgreen | Aug. 13, 1918 |
| 1,479,990 | Keys | Jan. 8, 1924 |
| 1,550,311 | Foster | Aug. 18, 1925 |
| 1,570,085 | Saxe | Jan. 19, 1926 |
| 2,385,632 | Louthan | Sept. 25, 1945 |
| 2,445,056 | Cordis | July 13, 1948 |
| 2,518,601 | Cordis | Aug. 15, 1950 |
| 2,532,351 | Wedebrock | Dec. 5, 1950 |
| 2,580,306 | Leach et al. | Dec. 25, 1951 |
| 2,595,333 | Clapp | May 6, 1952 |
| 2,601,608 | Hansen | June 24, 1952 |
| 2,651,438 | Peterson | Sept. 8, 1953 |
| 2,671,696 | McLean | Mar. 9, 1954 |

UNITED STATES PATENT OFFICE
CERTIFICATE OF CORRECTION

Patent No. 2,719,058

September 27, 1955

Frederick E. Van Dusen

It is hereby certified that error appears in the printed specification of the above numbered patent requiring correction and that the said Letters Patent should read as corrected below.

Column 4, line 66, after "end" insert -- 60 --; column 7, lines 10 and 11, after "housing" for "135" read -- 137 --; column 8, line 21, after "55" for "is" read -- in --; column 11, line 48, for "cup" read -- cut --; column 15, line 27, for "said" read -- an --; line 30, for "said" read -- the --; line 44, for "and" insert -- end --.

Signed and sealed this 9th day of June 1959.

(SEAL)
Attest:

KARL H. AXLINE
Attesting Officer

ROBERT C. WATSON
Commissioner of Patents